US 8,857,378 B2

(12) United States Patent
De Rooij

(10) Patent No.: US 8,857,378 B2
(45) Date of Patent: Oct. 14, 2014

(54) DEVICE FOR TREATING ANIMALS, COMPRISING A TRAY WHICH IS SUITABLE TO BE TROD UPON BY THE ANIMALS

(75) Inventor: Arie Maurits De Rooij, Sprang-Capelle (NL)

(73) Assignee: DE ROOIJ Staltechniek B.V., Waalwijk (NL)

( * ) Notice: Subject to any disclaimer, the term of this patent is extended or adjusted under 35 U.S.C. 154(b) by 723 days.

(21) Appl. No.: 13/126,271

(22) PCT Filed: Oct. 27, 2009

(86) PCT No.: PCT/NL2009/000202
§ 371 (c)(1),
(2), (4) Date: May 19, 2011

(87) PCT Pub. No.: WO2010/050799
PCT Pub. Date: May 6, 2010

(65) Prior Publication Data
US 2011/0271912 A1    Nov. 10, 2011

(30) Foreign Application Priority Data
Oct. 28, 2008  (NL) ..................................... 1036124

(51) Int. Cl.
*A01K 13/00* (2006.01)
*A01K 29/00* (2006.01)
*A61D 11/00* (2006.01)

(52) U.S. Cl.
CPC .............. *A01K 13/003* (2013.01); *A61D 11/00* (2013.01)
USPC ........................................ 119/673; 119/603

(58) Field of Classification Search
CPC ...... A61D 7/00; A61D 11/00; A01K 13/0001
USPC ......... 119/602, 603, 650, 652, 662, 673, 675, 119/676, 669
See application file for complete search history.

(56) References Cited

U.S. PATENT DOCUMENTS

| 8,276,545 | B2 * | 10/2012 | Greeson ......................... 119/604 |
| 2008/0072840 | A1 * | 3/2008 | Rajkondawar et al. ....... 119/652 |
| 2011/0290196 | A1 * | 12/2011 | Eakin ............................. 119/651 |
| 2013/0098307 | A1 * | 4/2013 | Offhaus ......................... 119/664 |

FOREIGN PATENT DOCUMENTS

| EP | 1099373 A1 * | 5/2001 |
| EP | 1905383 A2 * | 4/2008 |
| EP | 1920652 A1 * | 5/2008 |
| WO | WO 9905905 A1 * | 2/1999 |

* cited by examiner

*Primary Examiner* — Kimberly Berona
(74) *Attorney, Agent, or Firm* — Troutman Sanders LLP; Ryan A. Schneider; Daniel Sharpe

(57) ABSTRACT

A device (1) for performing a cleaning and/or disinfecting treatment on body parts of animals comprises a treatment zone (2) which is adapted to receive the animals to be treated; means (6) for guiding the animals through the treatment zone (2) in a defined walking direction; a treatment tray (3) which is suitable for containing a quantity of cleaning and/or disinfecting liquid, which is located at ground level in the treatment zone (2), in a horizontal operational position, and which is therefore suitable to be trod upon by the animals; and means (7) for tilting the treatment tray (3) and thereby allowing liquid from the treatment tray (3) to drain off from the treatment tray (3) to an area which is located outside of areas which are located in front of the device (1) and behind the device (1) as seen in the walking direction. In this device (1), contamination of a walking path of the animals to be treated is avoided.

20 Claims, 12 Drawing Sheets

DEVICE FOR TREATING ANIMALS, COMPRISING A TRAY WHICH IS SUITABLE TO BE TROD UPON BY THE ANIMALS

CROSS-REFERENCE TO RELATED APPLICATIONS

This application is a US National Stage of International Application No. PCT/NL2009/000202, filed 27 Oct. 2009, which claims the benefit of NL 1036124, filed 28 Oct. 2008.

FIELD OF THE INVENTION

The invention relates to a device for performing a cleaning and/or disinfecting treatment on body parts of animals, comprising a treatment zone which is adapted to receive the animals to be treated; means for guiding the animals through the treatment zone in a defined walking direction; and a treatment tray which is suitable for containing a quantity of cleaning and/or disinfecting liquid, which is located at ground level in the treatment zone, in a horizontal operational position, and which is therefore suitable to be trod upon by the animals.

BACKGROUND OF THE INVENTION

A cleaning and/or disinfecting treatment can be performed on claws of cows, for example. This is particularly of importance in so-called walking stables, in which the cows walk a fixed route, usually twice a day, in order to reach a place where a milking machine and food are present. While walking, the cows come into contact with their own manure and the manure of other cows, as a result of which the cows catch disorders of the claws, such as sores, Mortellaro or foot-rot. These disorders can be prevented by regularly cleaning and disinfecting the claws.

Cleaning and disinfecting can take place manually, wherein the claws of the cows are sprayed by means of a sprayer. However, this is a very labour-intensive process, and consequently a relatively expensive process. Therefore, devices having a treatment zone have been developed, wherein the cow can walk through this zone and be treated there. Such devices offer the possibility of letting the treatment take place in a completely automatic manner.

A device for cleaning and disinfecting claws of cows is known from Dutch patent 1 009 895. The known device comprises a tray on which a cow places her legs when she takes place in the device. In the tray, a spraying system is present, which comprises sprayers for spraying the back legs of the cow with a cleaning liquid and a disinfecting liquid. After the cow has left the device again, dirt such as manure, which has fallen in the tray during the treatment of the cow, is removed. In the process, use is made of sprayers, among other things, which spray from the front to the back during treatment of the cow, wherein the terms "front" and "back" are related to the walking direction of a cow through the device: this is from the front to the back. By means of the sprayers, during the cleaning of the tray, the dirt is sprayed from the front to the back out of the tray via apertures, wherein the dirt ends up behind the tray.

The way in which the device which is known from Dutch patent 1 009 895 is cleaned has at least two important disadvantages. A first important disadvantage is that the dirt ends up behind the tray, as a result of which a cow comes directly into contact with the dirt of previous cows after she has been treated in the device. A second important disadvantage is that cleaning of the tray takes a rather long time, which can not be used for receiving and treating a cow.

A device for cleaning and disinfecting of claws of cows is also known from European patent application 1 099 373. In this known device, cleaning of the tray takes place in another manner than the above-described manner. The tray of this known device comprises a pivotably mounted grid and an underlying sieve. Each time after approximately ten cows have visited the device, the tray is cleaned, wherein the grid and the underlying sieve are put in an almost vertical position with the help of a cylinder, wherein dirt which is present on the grid and the sieve glides downwards. Subsequently, the dirt is washed away and pumped out of the tray by way of the sprayers which are present in the tray.

Besides the option of spraying a useful cleaning and/or disinfecting liquid onto claws of an animal such as a cow, an option of having a treatment tray which is filled with the appropriate liquid, wherein the animal needs to walk through the tray for letting the liquid act on its claws, is also available. In such a case, in order to prevent contamination, it is necessary to refresh the liquid contained by the treatment tray on a regular basis. It is an objective of the invention to provide a device comprising a treatment tray, in which a process of replacing a quantity of liquid which is present in the tray by a fresh quantity may be performed very fast, and in which the risk of contamination between animals is as low as possible. This objective is achieved by a device as mentioned in the opening paragraph, i.e. a device comprising a treatment zone, means for guiding the animals through the treatment zone in a defined walking direction, and a treatment tray, which device further comprises means for tilting the treatment tray and thereby allowing liquid from the treatment tray to drain off from the treatment tray to an area which is located outside of areas which are located in front of the device and behind the device as seen in the walking direction.

According to the invention, the treatment tray has a tiltable arrangement. Such an arrangement allows for a very quick emptying of the treatment tray, as the liquid which is present in the tray immediately pours out of the tray when the tray is tilted. Furthermore, the means for tilting the treatment tray are adapted to tilt the tray in such a way that the liquid flows to an area which is located outside of areas which are located in front of the device and behind the device as seen in the walking direction. In this way, it is guaranteed that the discharged liquid cannot reach the areas where the animals are walking when they are entering and/or exiting the treatment device. Hence, the risk of contamination is as low as possible. It is noted that it is preferred to have means such as a suitable drain covered by a grid for receiving the liquid from the tilted treatment tray and allowing the liquid to flow away from the treatment device.

BRIEF SUMMARY OF THE INVENTION

When the walking direction is defined as being from front to back through the treatment zone of the device, it may be said that the treatment tray is tiltable such as to discharge liquid at a side of the device. As is apparent from the foregoing, a tiltably arranged tray is known from European patent application 1 099 373, but this tray is not suitable for realizing a direct discharge of liquid outside of the device. Instead, in the known construction, the liquid is pumped from the tray when the tray is in an almost vertical position. Furthermore, the tray is tilted around a tilting axis extending perpendicular to the walking direction, so that if a direct discharge would take place from the tray, this discharge would be to the front or the back of the device.

It is clear from the foregoing that the fact that the treatment tray is tiltable such as to discharge liquid outside of a walking path of the animals is an important aspect of the invention. In particular, the treatment tray may be tiltable around a tilting axis extending substantially in the walking direction. In any case, in the device according to the invention, contamination of the walking path is prevented. An animal may safely walk to and from the device without the risk of contacting manure or other dirt.

In a preferred embodiment of the device according to the invention, the tilting means are adapted to put the treatment tray from the horizontal operational position, i.e. the position for receiving the animals, to a vertical or close to vertical position in which the treatment tray is not in use. On the basis of this function of the tilting means, a possibility of getting the treatment tray practically out of the walking path is created, which is advantageous in view of cleaning and maintenance.

In practical cases, the device according to the invention is equipped with a frame, which plays a role in guiding the animals through the device in a correct manner, and which serves for supporting various components of the device. With such a frame being present, it is very well possible for the treatment tray to be connected to the frame through at least one bar which is arranged such as to be retractable and extendable. It is practical for the treatment tray to be rectangular, wherein the bar is pivotably attached to a side of the tray extending in the walking direction. In such a case, when the length of the bar is varied, it is achieved that the tray tilts about its opposite side which remains on ground level during the tilting process, due to gravity.

It is preferred if the device according to the invention comprises at least two supply systems, wherein each supply system has a reservoir for containing a quantity of disinfecting agent, a conduit for supplying disinfecting agent to the treatment tray, and a pump for displacing disinfecting agent from the reservoir to the treatment tray, through the conduit. By having at least two supply systems which are intended to be used for supplying disinfecting agent, it is easy to bring variation into the use of disinfecting agents, which is advantageous in view of the prevention of immunity to the disinfecting agents.

Preferably, the device according to the invention further comprises a filling tray which is arranged at a higher level in the device than the treatment tray in the operational position, and which is suitable to contain a quantity of liquid, wherein a conduit is provided for transporting liquid from the filling tray to the treatment tray in the operational position. A filling tray as mentioned can be used for guaranteeing a quick filling process of the treatment tray. In the process, a pump is not required, as a transport of liquid from the filling tray to the treatment tray can be performed on the basis of gravity. Furthermore, it is also possible to use a quantity of liquid from the filling tray for rinsing the treatment tray. For example, the conduit for transporting liquid from the filling tray to the treatment tray may be a tube having a suitable diameter. When the device has a frame as mentioned earlier, the tube may be integrated in the frame.

It is preferred if the filling tray is Only used for containing water and supplying water to the treatment tray, as in that case, a potentially dangerous situation in which hazardous agents are present at a level which is considerably higher than ground level is avoided. When the treatment tray needs to be filled with a fresh quantity of disinfecting liquid, this may be done by transporting first quantity of water from the filling tray to the treatment tray, adding the disinfecting agent by activating an appropriate supply system, and transporting a second quantity of water from the filling tray to the treatment tray, so that an effective mixing of the disinfecting agent and the water is automatically obtained, and there is no need for additional mixing means.

In a practical embodiment of the device according to the invention, in order to prevent a constant flow of liquid from the filling tray to the treatment tray, the device comprises means which are suitable to allow a connection of the filling tray to the conduit for transporting the liquid to the treatment tray to be open in a first position, and to close said connection in a second position. Advantageously, means are provided for automatically controlling the opening/closing means, wherein such means are programmed such as to avoid unnecessary spillage of liquid.

The filling tray may be provided with means for connecting the tray to a conduit for supplying liquid to the tray, wherein opening/closing means may furthermore be provided for controlling a filling process of the tray. In a practical embodiment, the opening/closing means may comprise a suitable float mechanism, which is capable of only allowing a supply of liquid when a liquid level in the tray is below a certain maximum level, and automatically shutting off the supply as soon as the maximum level appears to be reached. In more general words, the float mechanism is capable of operating the opening/closing means depending on the liquid level in the filling tray.

In general, in order for the device to work automatically, it is advantageous if the device is equipped with means for controlling various components of the device according to predetermined routines, wherein means for detecting relevant parameters are also provided and coupled to the controlling means.

With respect to the use of the filling tray as described, it is noted that such use does not necessarily need to be associated with the use of a tiltable treatment tray. Hence, the invention also relates to a device for performing a cleaning and/or disinfecting treatment on body parts of animals, comprising a treatment zone which is adapted to receive the animals to be treated; a treatment tray which is suitable for containing a quantity of cleaning and/or disinfecting liquid, which is located at ground level in the treatment zone, in a horizontal operational position, and which is therefore suitable to be trod upon by the animals; and a filling tray which is arranged at a higher level in the device than the treatment tray in the operational position, and which is suitable to contain a quantity of liquid, wherein a conduit is provided for transporting liquid from the filling tray to the treatment tray in the operational position.

BRIEF DESCRIPTION OF THE DRAWINGS

The invention will be explained in more detail on the basis of the following description of an embodiment of a device for performing a cleaning and/or disinfecting treatment on claws of cows. In the process, reference will be made to the drawing, in which equal reference signs indicate equal or similar components, and in which.

DETAILED DESCRIPTION OF PREFERRED EMBODIMENTS

Figure 1:
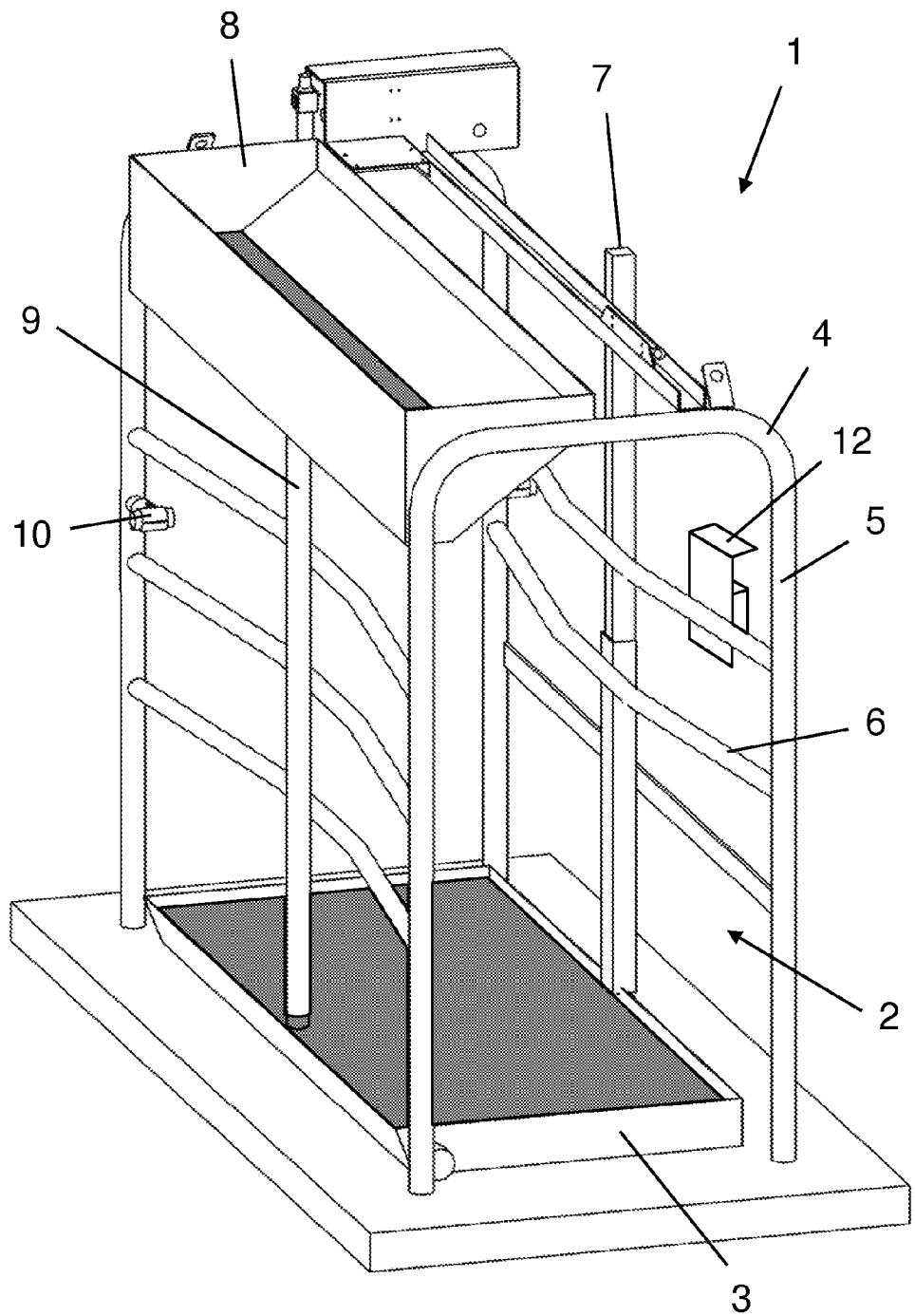
FIGS. 1 and 2 diagrammatically show various perspective views of the embodiment of the treatment device according to the invention, in a state in which the device is suitable to be used for performing the desired treatment on a cow.

An embodiment of a device according to the invention for performing a cleaning and/or disinfecting treatment on claws of cows is shown in the figures, and is indicated in general by reference numeral 1.

Figure 2:
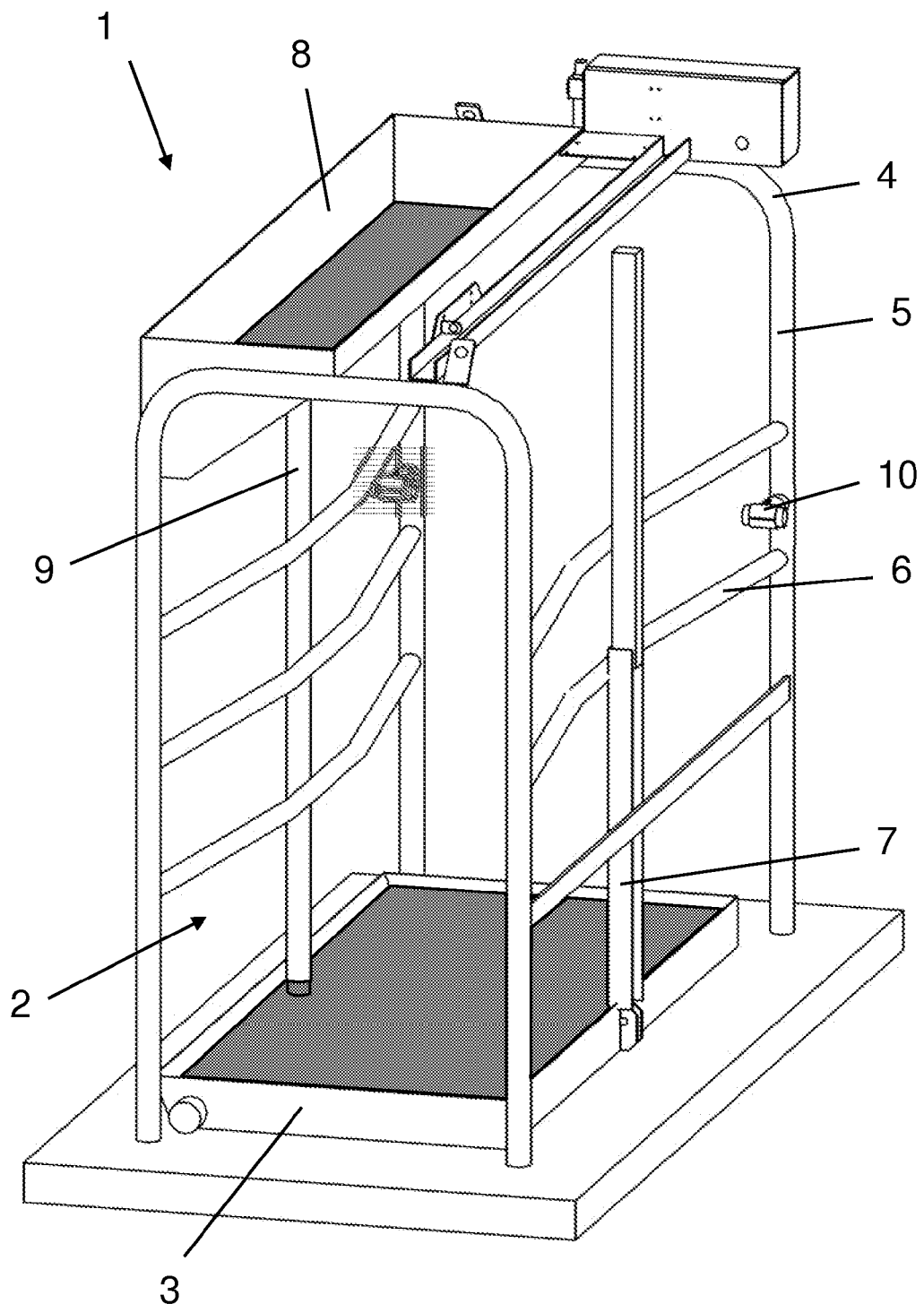

The treatment device 1 comprises a treatment zone 2 where a treatment tray 3, i.e. a shallow tray 3 which is arranged at ground level in a normal, operational position of the tray 3 as shown in FIGS. 1 and 2 is present. The treatment tray 3 serves for containing a quantity of liquid having cleaning and/or disinfecting properties. During use of the treatment device 1, a cow is supposed to walk to the treatment zone 2 and step inside the treatment tray 3, so that her claws are immersed in the liquid, and the cleaning and/or disinfecting treatment can actually take place. It is noted that in the figures, liquid is indicated as a dark-coloured mass. Furthermore, it is noted that in the shown example, the treatment tray 3 has a rectangular shape, which does not alter the fact that other suitable shapes are also possible within the scope of the invention.

Besides the treatment tray 3, the treatment device 1 comprises a frame 4 having standing supporting bars 5 and more or less horizontal bars 6 for guiding a cow during her walk through the device 1. The frame 4 is designed such as to be open at sides which are a front side and a back side as seen in a walking direction of a cow through the device 1, whereas the horizontal bars 6 serve for closing the sides. The openings at the front side and the back side of the frame 4 are large enough for allowing a cow to pass. On the other hand, the frame 4 constitutes a kind of tunnel in which it is not possible for a cow to turn, so that she is naturally guided through the frame 4 in the walking direction once she has entered the device 1.

Figure 3:
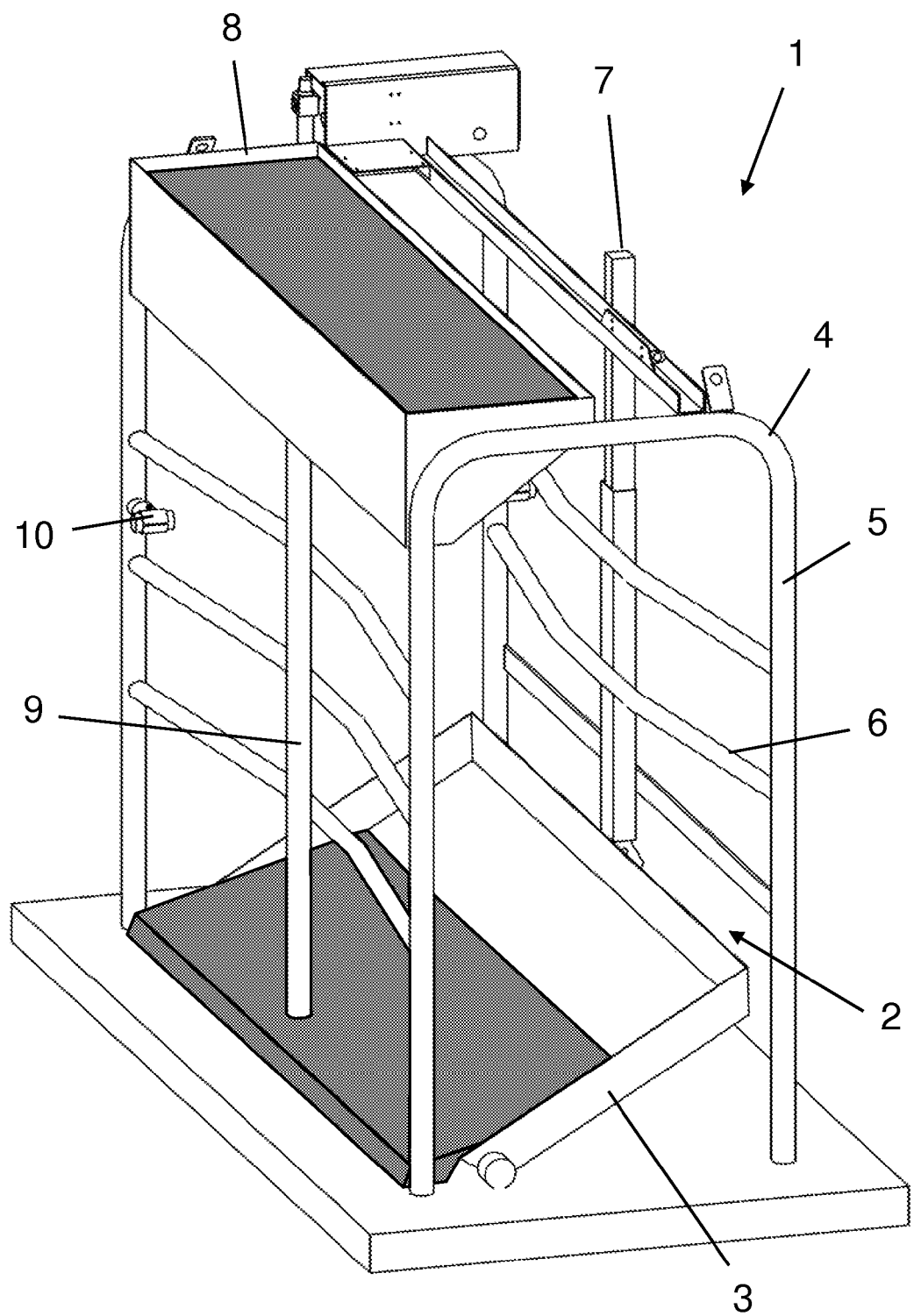
FIGS. 3 and 4 diagrammatically show various perspective views of the embodiment of the treatment device according to the invention, in a state in which a treatment tray of the device is emptied by tilting the tray.
Figure 4:
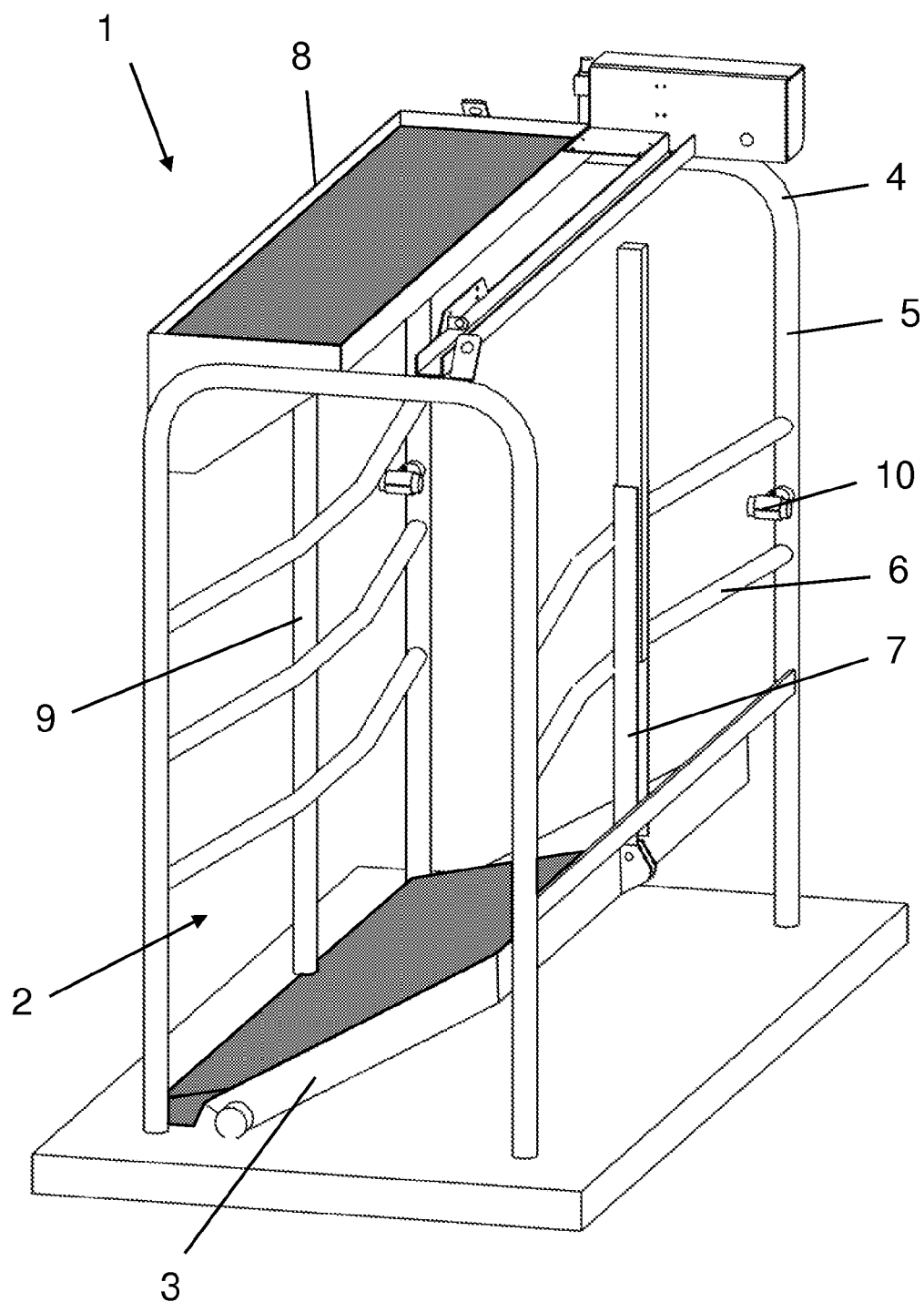

The more cows are treated in the device 1 by walking through the liquid which is present in the treatment tray 3, the more the effectiveness of the liquid decreases due to the absorption of dirt, microbes, etc. Therefore, it is desired to refresh the liquid from time to time. To this end, the treatment tray 3 needs to be emptied first, so that the used quantity of liquid can flow from the tray 3. In view of this, the treatment tray 3 is tiltably arranged in the treatment device 1. Within the scope of the invention, any suitable type of tiltable arrangement is possible. In the shown example, the treatment tray 3 is connected to the frame 4 through a telescopic bar 7 which is capable of extending and retracting. In particular, the telescopic bar 7 is extendible and retractable in a substantially vertical direction, wherein an end of the bar 7 is pivotably connected to a side of the treatment tray 3 extending in the walking direction, at a more or less central position. In this configuration, starting from the operational position of the treatment tray 3, the side as mentioned is pulled upward when the telescopic bar 7 is retracted, so that the tray 3 is tilted, wherein an opposite side of the tray 3 remains on ground level, due to gravity. In the process, the tilting movement is performed around a tilting axis which is at the position of the side that remains on ground level. During the tilting movement, this tilting axis is pulled toward the side of the frame 4 where the telescopic bar 7 is located. FIGS. 3 and 4 serve to illustrate an arbitrary stage during the tilting movement.

As a result of a tilting movement, the liquid that is present inside the treatment tray 3 is discharged from the tray 3, and flows from the treatment zone 2 to outside of the device 1, at a side of the treatment device 1. It is noted that any suitable means may be provided for receiving the discharged liquid at that location. A first important advantage of this way of discharging the liquid is that the liquid does not end up in a walking path of the cow, so that contamination is kept to a minimum when the device 1 is applied. Another important advantage of this way of discharging the liquid is that the emptying process only takes little time.

Figure 5:
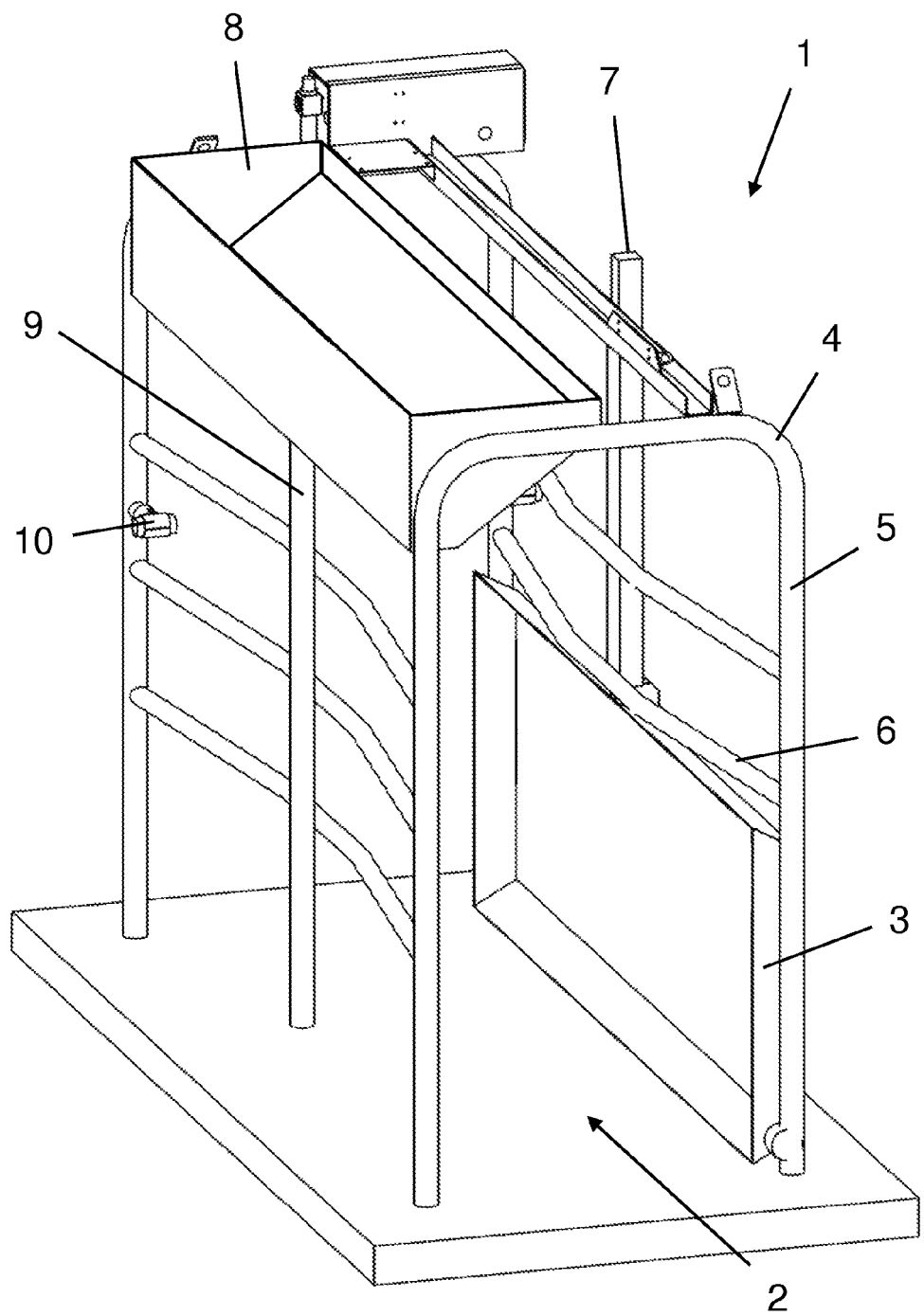
FIGS. 5 and 6 diagrammatically show various perspective views of the embodiment of the treatment device according to the invention, in a state in which the treatment tray is in a vertical, stowed-away position.
Figure 6:
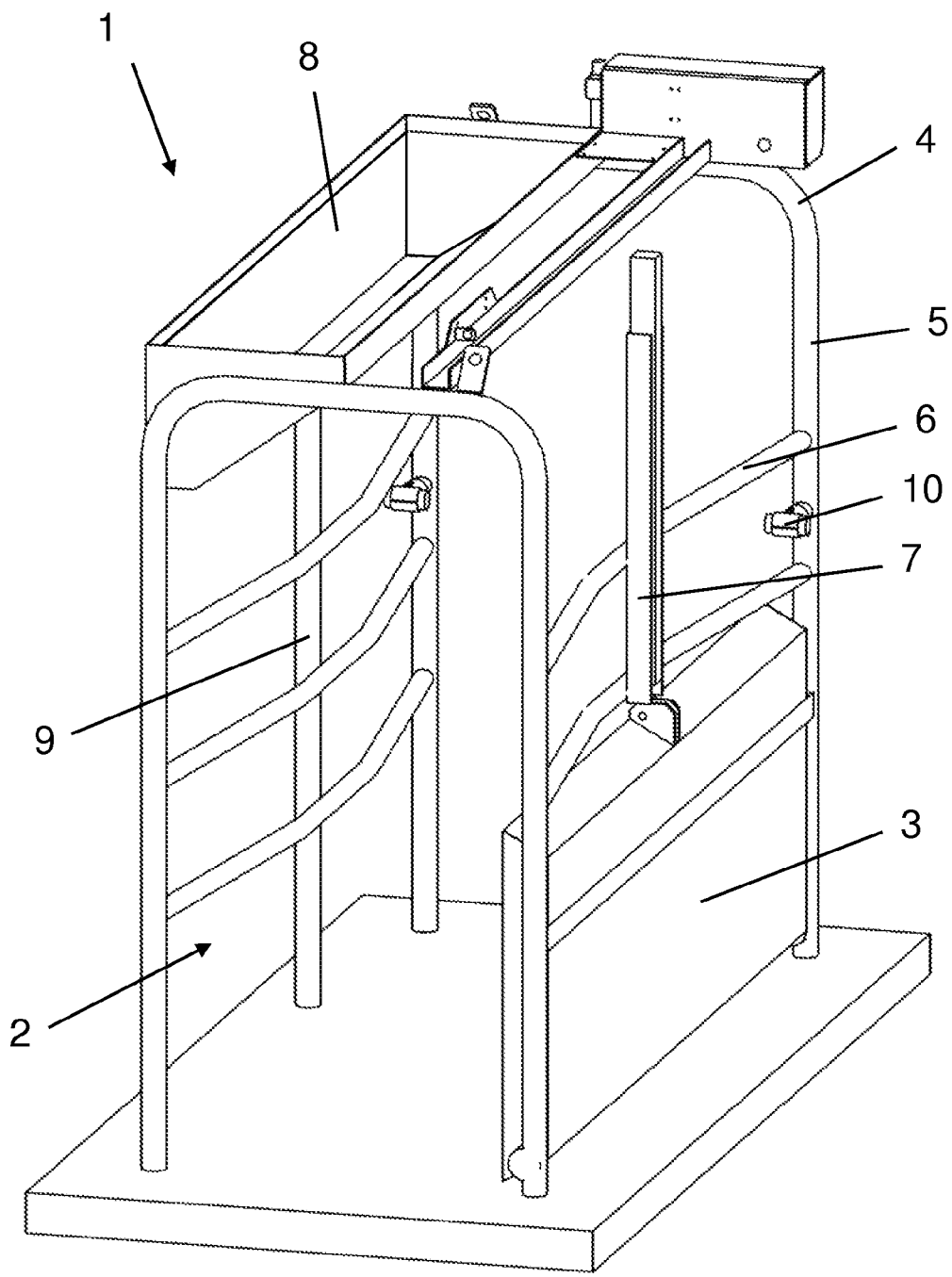

The telescopic bar 7 can be retracted to such an extent, that the treatment tray 3 is pulled in a more or less vertical position, and is positioned against the bars 5, 6 of the frame 4. In that position, the device 1 is freely accessible without the tray 3 being in the way, which may be handy in a situation of maintenance, for example. The stowed-away position of the tray 3 as described is illustrated in FIGS. 5 and 6.

The treatment device 1 comprises various components which have a function in filling the treatment tray 3 again after the tray 3 has been emptied. In the first place, the device 1 comprises systems for supplying disinfecting agent to the tray 3. For sake of completeness, it is noted that these systems are not shown in the figures. In the second place, the device 1 comprises another tray 8, which will hereinafter be referred to as filling tray 8, and which is intended to be filled with water. The filling tray 8 is positioned at a top of the frame 4, such as to be at a considerably higher level than the treatment tray 3. The treatment device 1 further comprises a hollow tube 9 extending from the filling tray 8 in a downward direction. This tube 9 serves for transporting water from the filling tray 8 to the treatment tray 3. Means for opening and closing a connection between the filling tray 8 and the tube 9 are provided for controlling the supply of water to the treatment tray 3.

The filling tray 8 is suitable to be connected to any type of means for supplying water. When the device 1 is operated, it is ensured that the filling tray 8 is always filled with a certain quantity of water. When the water level appears to be below a certain predetermined level, a filling process is started automatically in order to obtain the situation in which the desired quantity of water is present in the filling tray 8. To this end, a float mechanism (not shown) may be applied. In that case, the filling tray 8 is comparable to a cistern of a toilet. When the opening/closing means are put to an opened position, the content of the filling tray 8 is flushed down the tube 9. After the filling tray 8 had been emptied, the opening/closing means are put a closed position again, and a filling process of the filling tray 8 takes place. The filling process is controlled by the float mechanism, and is terminated as soon as the predetermined water level has been reached.

The water from the filling tray 8 may be used for filling the treatment tray 3, and it is also possible to use this water for rinsing the treatment tray 3. The indirect supply of water to the treatment tray 3 through the filling tray 8 has the advantage that this supply does not require much time. The quantity of water which may be contained by the filling tray 8 is adapted to the volume of the treatment tray 3, so that it is actually possible to realize a desired filling of the treatment tray 3 when the filling tray 8 is emptied.

Preferably, a process of emptying the treatment tray 3 and filling the tray 3 again is performed automatically. To this end, the treatment device 1 may be equipped with any suitable controlling means. In order to ensure that a liquid refreshing process takes place after a certain number of treatments have been performed on cows, the device 1 may comprise a counting mechanism having sensors 10 for detecting the presence of a cow.

All in all, the device 1 according to the invention offers safety, reliability and ease of use. The filling of the trays 3, 8 of the device 1 takes place automatically. Also, the process of refreshing the content of the treatment tray 3 is an automatic process, during which the treatment tray 3 is tilted so that a used quantity of liquid can be discharged to an area at a side of the device 1. The refreshing process is performed every once in a while on the basis of counts of the cows passing the device 1, wherein there is a no need for manual control, as the counts are performed by a suitable mechanism having sensors for detecting the presence of a cow.

FIGS. 7-11 serve to illustrate various stages of possible use of the treatment device 1 according to the invention.

Figure 7:
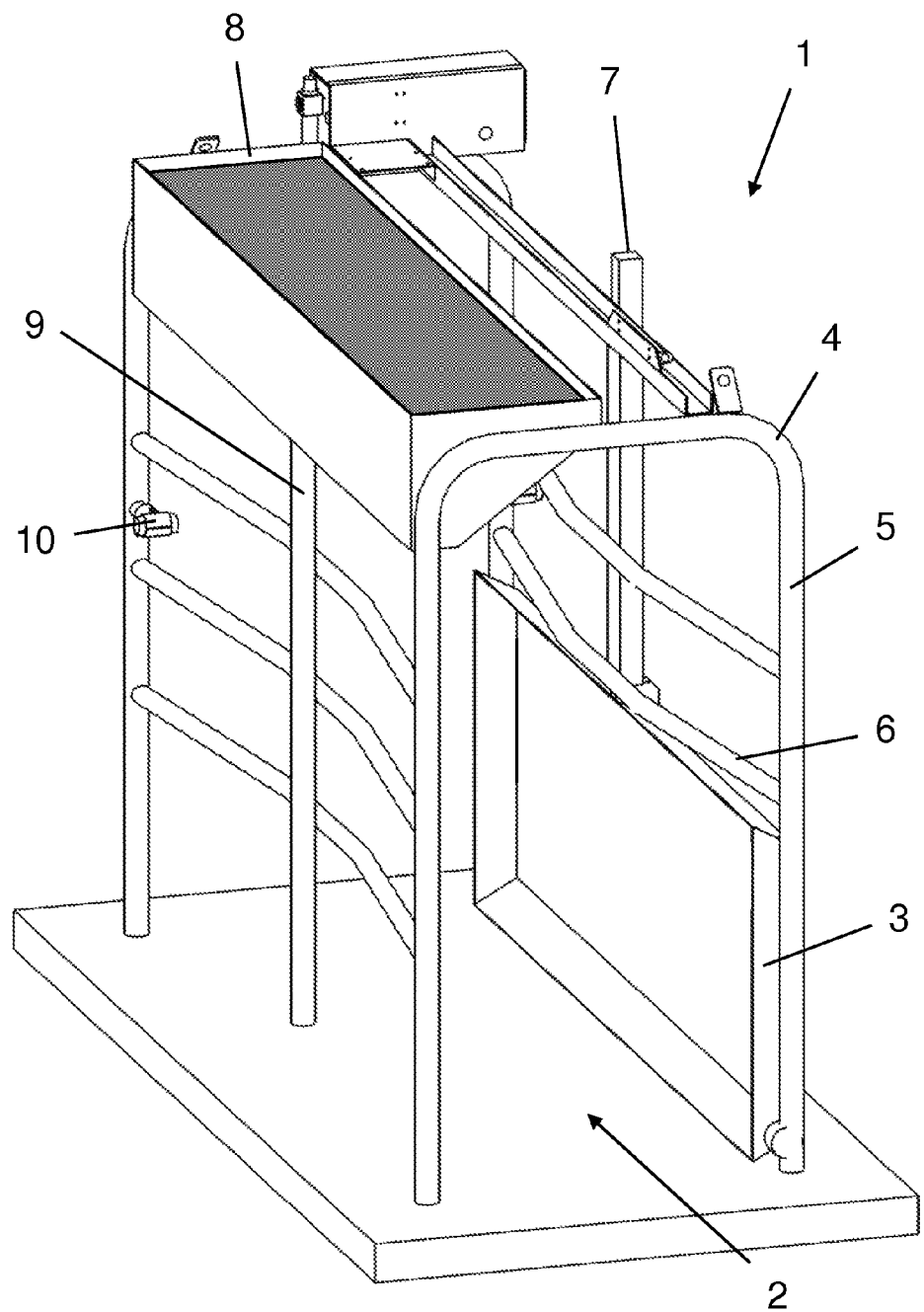
FIGS. 7-11 illustrate various stages of possible use of the embodiment of the treatment device according to the invention.

In a first stage as illustrated by FIG. 7, the treatment tray 3 is in the stowed-away position, and the filling tray 8 is filled with a maximum quantity of water. If a cow walks through the device 1 during this first stage, she will not contaminate the treatment tray 3.

Figure 8:
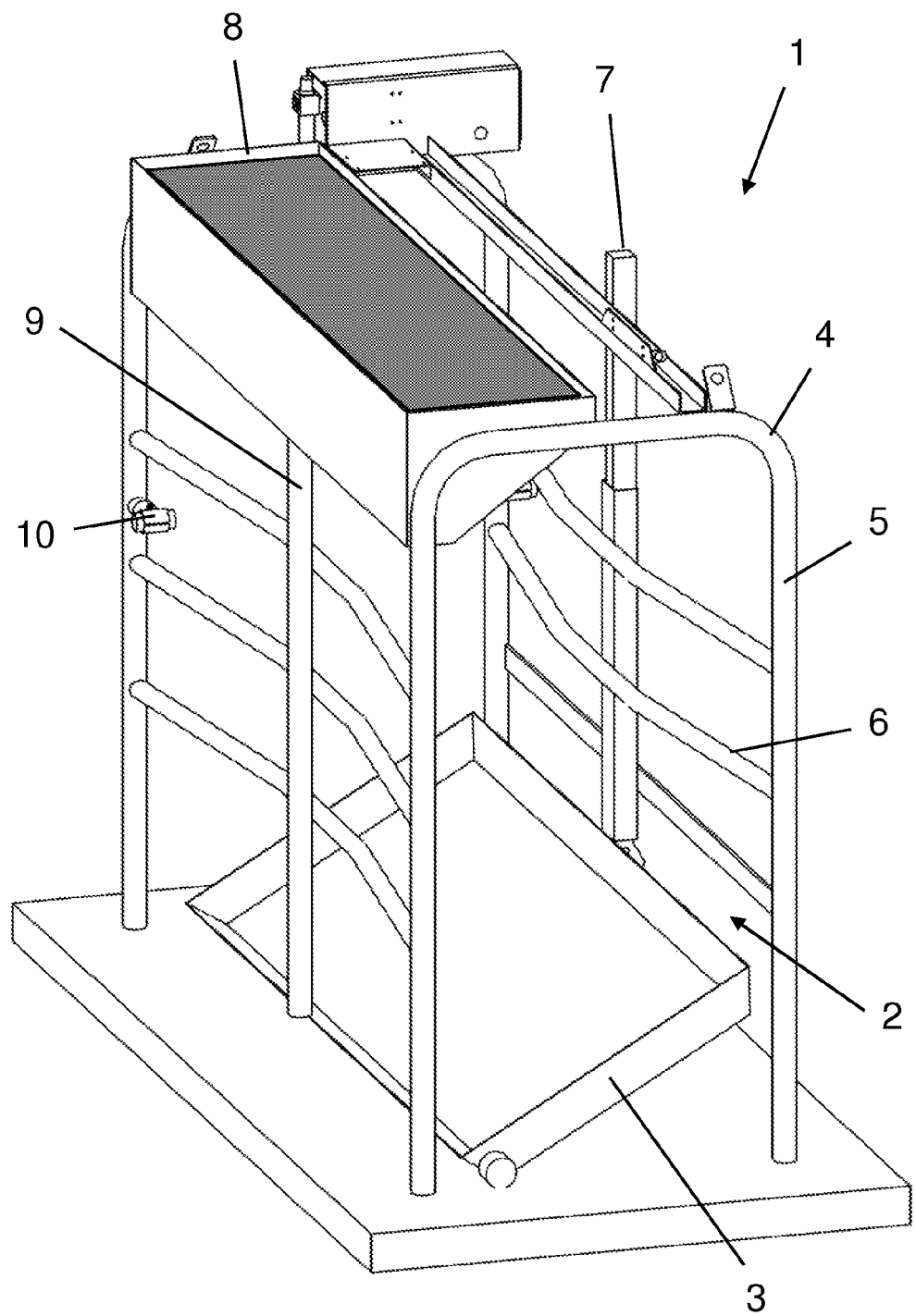

In a second stage as illustrated by FIG. 8, the telescopic bar 7 which is connected to the treatment tray 3 is extended, and the tray 3 is put to the operational position.

Figure 9:
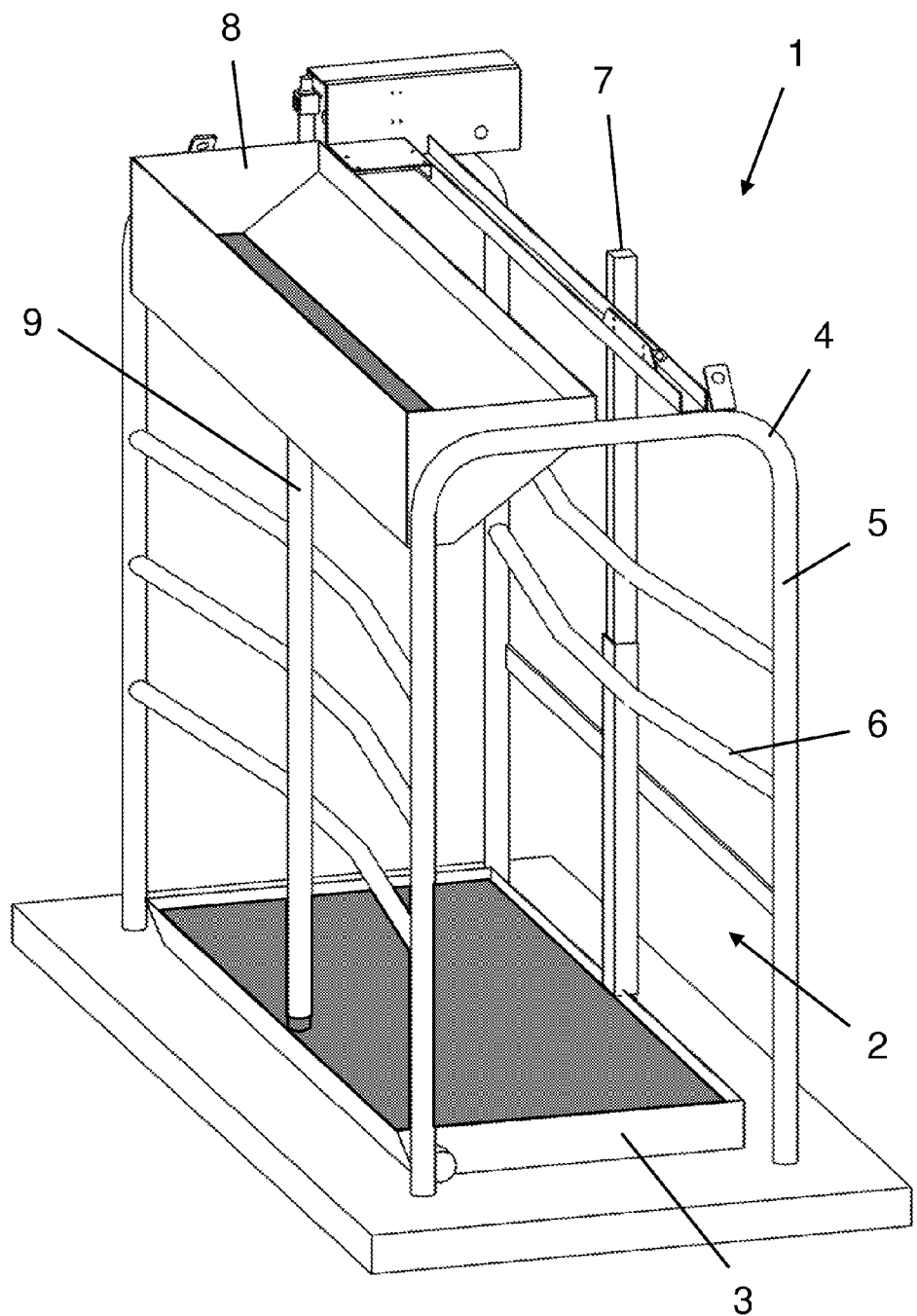

In a third stage as illustrated by FIG. 9, the treatment tray 3 has reached the operational position, and the filling tray 8 is emptied for the purpose of filling the treatment tray 3 with water. Furthermore, disinfecting agent is added to the water by means of one of the supply systems of the device 1. At that point, the device 1 is ready to perform its actual function of treating claws of cows.

Figure 10:
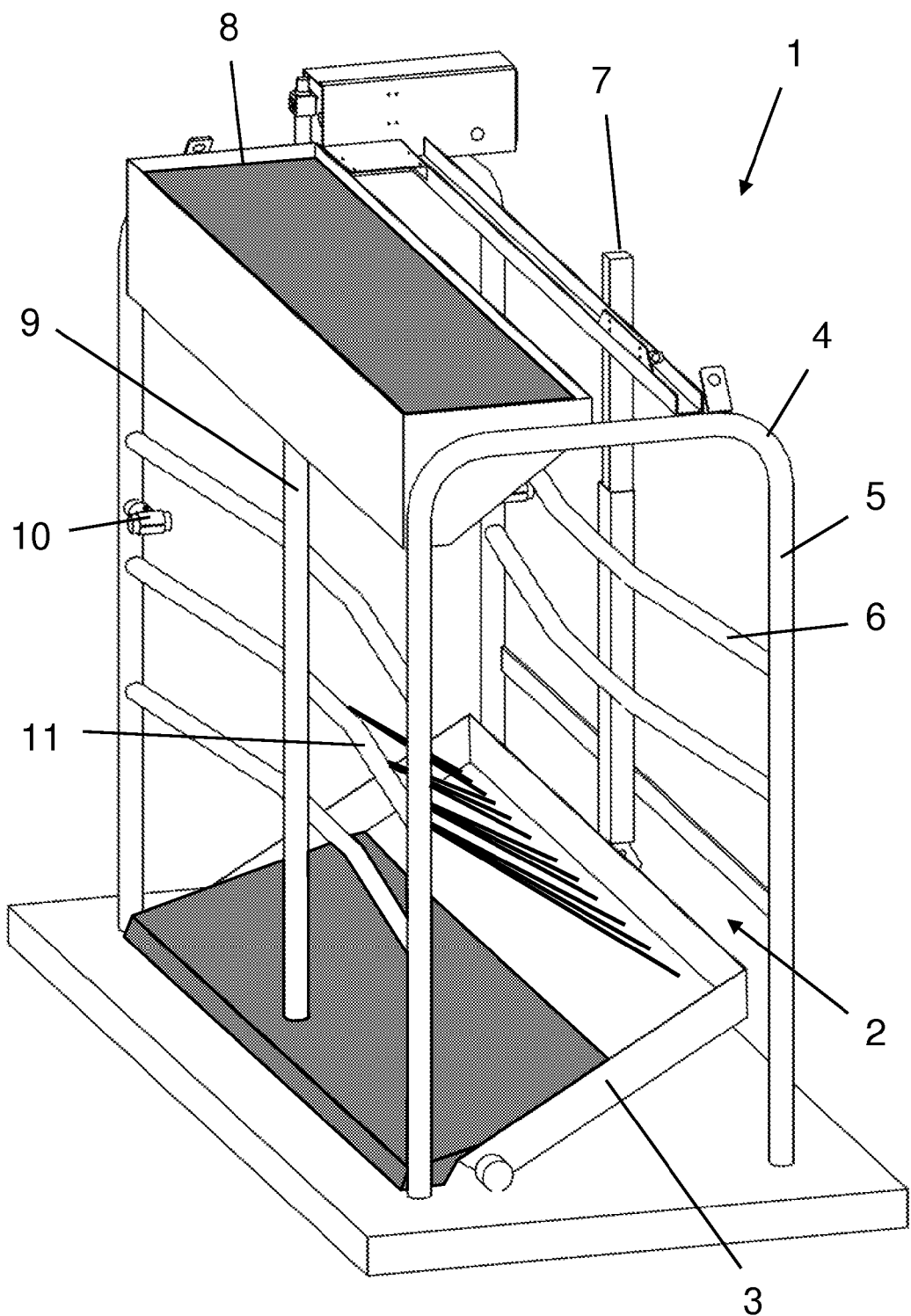

In a fourth stage as illustrated by FIG. 10, a decision is made to discharge the content of the treatment tray 3. This decision may be taken by a user person, and communicated to the controlling means of the device 1 by means of a push button or the like, but it is also possible that this decision is taken automatically on the basis of counts of the cows which have passed through the device 1. In any case, the treatment tray 3 is tilted such that the liquid flows from the tray 3 to outside the device 1. FIG. 10 shows that the device 1 may be equipped with sprayers 11 for spraying cleaning liquid on the tray 3, which sprayers 11 may be integrated in the frame 4.

Figure 11:
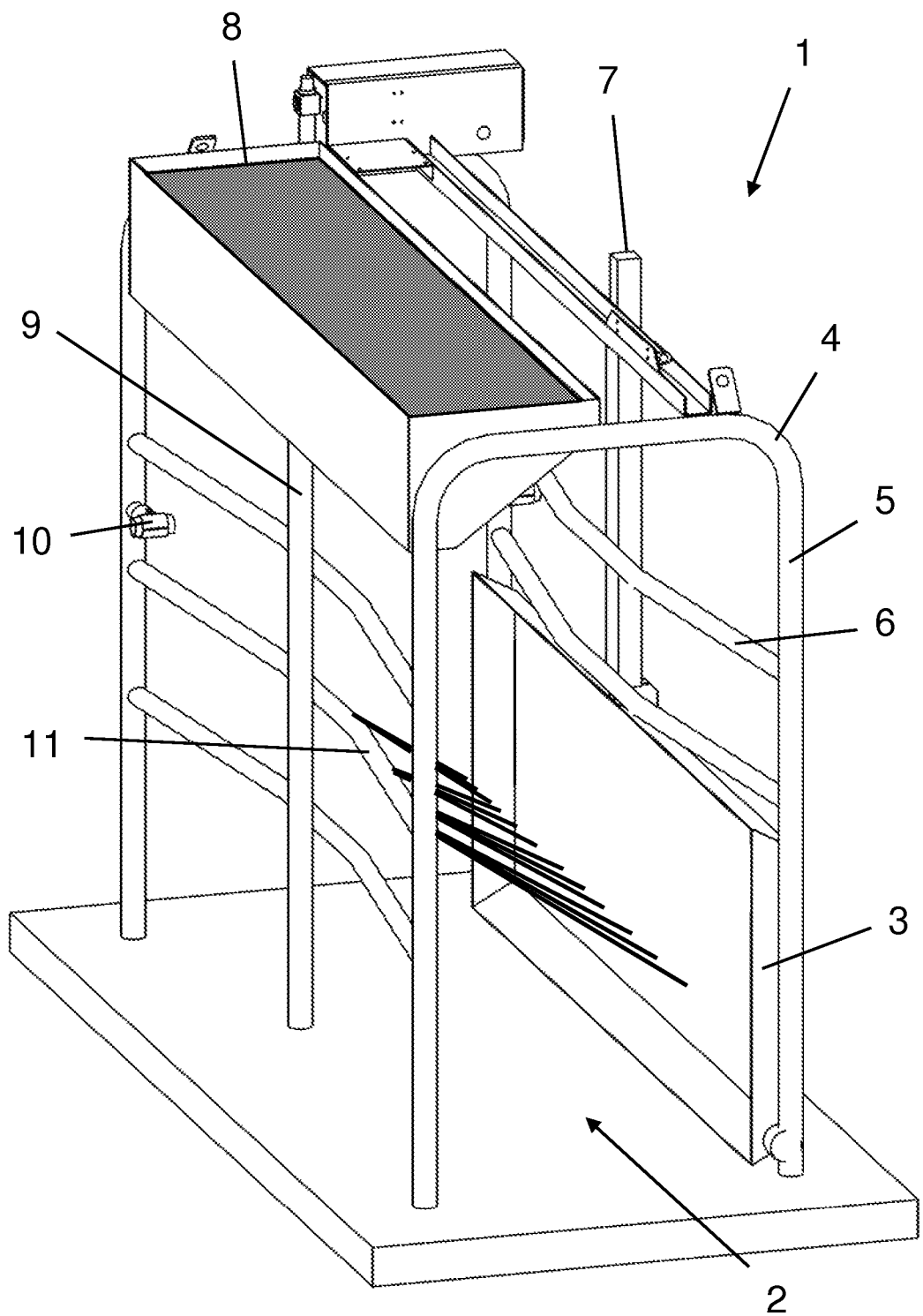

In a fifth stage as illustrated by FIG. 11, the treatment tray 3 is tilted all the way to the stowed-away position, while the process of spraying cleaning liquid on the tray 3 by means of the sprayers 11 is continued.

Once the treatment tray 3 is in the stowed-away position again, and the spraying has been terminated, the process of putting the tray 3 back to the operational position and filling it again with a desired liquid may be initiated at any desired moment. If desired, additional cleaning actions may be performed first. The processes of positioning the tray 3 and filling the tray 3 do not require any manual control, and do not need to take more time than a few minutes. An important time-saving factor is that the treatment tray 3 is filled with water that is drawn from the filling tray 8.

Figure 12:
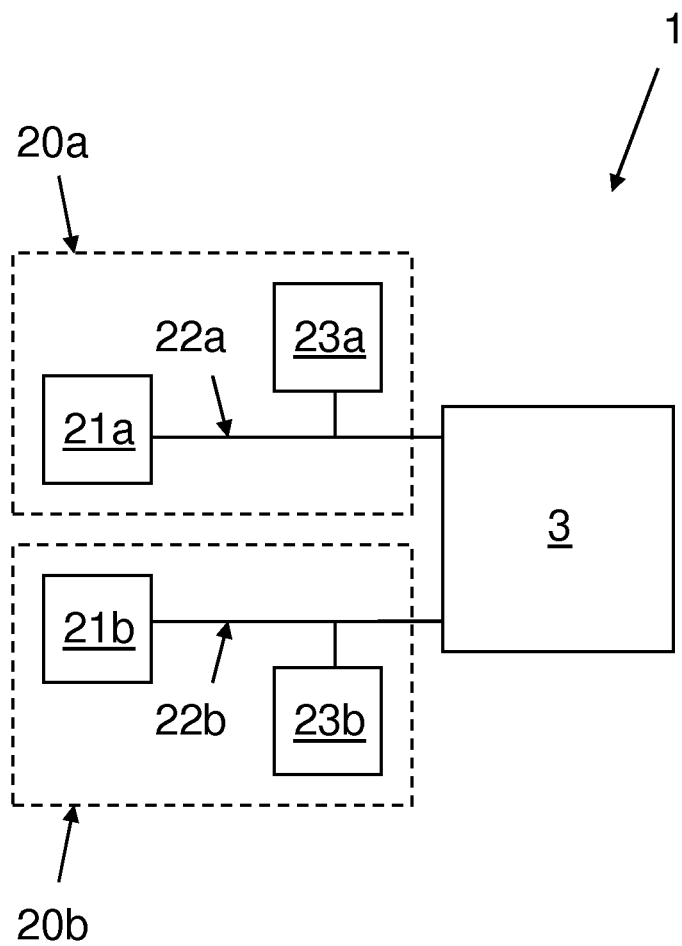
FIG. 12 shows a device according to the invention having a treatment tray, wherein the device further comprises two supply systems for supplying disinfecting agent to the treatment tray.

FIG. 12 shows a device 1 according to the invention having a treatment tray 3, wherein the device 1 further comprises two supply systems 20a, 20b for supplying disinfecting agent to the treatment tray 3. Each supply system 20a, 20b has a reservoir 21a, 21b for containing a quantity of disinfecting agent, a conduit 22a, 22b for supplying disinfecting agent to the treatment tray 3, and a pump 23a, 23b for displacing disinfecting agent from the reservoir 21a, 21b to the treatment tray 3.

It will be clear to a person skilled in the art that the scope of the invention is not limited to the examples discussed in the foregoing, but that various amendments and modifications thereof are possible without deviating from the scope of the invention as defined in the appended claims.

The treatment device 1 as shown in the figures is suitable for treating cows, as has been described in the foregoing. However, that does not alter the fact that a treatment device 1 according to the invention may also very well be suitable for treating other animals, wherein the suitability is particularly associated with the dimensions of the treatment device 1.

Besides the components as described in the foregoing, the treatment device 1 according to the invention may be equipped with any suitable additional component for performing any desired additional function. For example, the device 1 may have a mechanism for identifying the cows, so that it is possible for a user person to check if all cows which need to be treated by means of the device 1 have actually walked through the device 1 at a certain point in time, or not.

In the foregoing, a device 1 for performing a cleaning and/or disinfecting treatment on body parts of animals has been described. According to the invention, the device 1 comprises a treatment zone 2 which is adapted to receive the animals to be treated; means 6 for guiding the animals through the treatment zone 2 in a defined walking direction; a treatment tray 3 which is suitable for containing a quantity of cleaning and/or disinfecting liquid, which is located at ground level in the treatment zone 2, in a horizontal operational position, and which is therefore suitable to be trod upon by the animals; and means 7 for tilting the treatment tray 3 and thereby allowing liquid from the treatment tray 3 to drain off from the treatment tray 3 to an area which is located outside of areas which are located in front of the device 1 and behind the device 1 as seen in the walking direction. In this device 1, contamination of a walking path of the animals to be treated is avoided. Furthermore, fast filling of the treatment tray 3 is ensured when a filling tray 8 is used, wherein this filling tray 8 is preferably located at a higher level in the device 1 than the treatment tray 3 in the operational position, so that the filling process may take place under the influence of gravity.

The invention claimed is:

1. Device for performing a cleaning and/or disinfecting treatment on body parts of animals, comprising:
 a treatment zone which is adapted to receive the animals to be treated;
 means for guiding the animals through the treatment zone in a defined walking direction;
 a treatment tray which is suitable for containing a quantity of cleaning and/or disinfecting liquid, which is located at ground level in the treatment zone, in a horizontal operational position, and which is therefore suitable to be trod upon by the animals; and
 means for tilting the treatment tray and thereby allowing liquid from the treatment tray to drain off from the treatment tray to an area which is located outside of areas which are located in front of the device and behind the device as seen in the walking direction.

2. Device according to claim 1, wherein the treatment tray is tiltable around a tilting axis extending substantially in the walking direction.

3. Device according to claim 1, wherein the tilting means are adapted to put the treatment tray from the horizontal operational position to a substantially vertical position in which the treatment tray is not in use.

4. Device according to claim 1, further comprising a frame, wherein the treatment tray is connected to the frame through at least one retractable and extendable bar.

5. Device according to claim 4, wherein the treatment tray is rectangular, and wherein the bar is pivotably attached to the treatment tray, at a side of the tray extending substantially in the walking direction.

6. Device according to claim 1, further comprising at least two supply systems, wherein each supply system has a reservoir for containing a quantity of disinfecting agent, a conduit for supplying disinfecting agent to the treatment tray, and a pump for displacing disinfecting agent from the reservoir to the treatment tray, through the conduit.

7. Device according to claim 1, further comprising a filling tray which is arranged at a higher level in the device than the treatment tray in the operational position, and which is suitable to contain a quantity of liquid, wherein a conduit is provided for transporting liquid from the filling tray to the treatment tray in the operational position.

8. Device according to claim 7, further comprising means which are suitable to allow a connection of the filling tray to the liquid transporting conduit to be open in a first position, and to close the connection of the filling tray to the liquid transporting conduit in a second position.

9. Device according to claim 7, wherein the filling tray has means for connecting the filling tray to a conduit for supplying liquid, wherein furthermore means are provided which are suitable to allow the connection to be open in a first position, and to close the connection in a second position, and wherein a float mechanism is provided in the filling tray to operate the latter means depending on a liquid level in the filling tray.

10. Device according to claim 1, further comprising means for controlling various components of the device according to predetermined routines, wherein means for detecting relevant parameters are also provided and coupled to the controlling means.

11. Device for performing a cleaning and/or disinfecting treatment on body parts of animals, comprising:
   a treatment zone which is adapted to receive the animals to be treated;
   guiding means for guiding the animals to walk through the treatment zone in a defined walking direction;
   a treatment tray which is suitable for containing a quantity of cleaning and/or disinfecting liquid, which is located at ground level in the treatment zone, in a horizontal operational position, and which is therefore suitable to be trod upon by the animals; and
   a filling tray which is arranged at a higher level in the device than the treatment tray in the operational position, and which is suitable to contain a quantity of liquid, wherein a conduit is provided for transporting liquid from the filling tray to the treatment tray in the operational position.

12. Device according to claim 11, further comprising means which are suitable to allow a connection of the filling tray to the liquid transporting conduit to be open in a first position, and to close the connection of the filling tray to the liquid transporting conduit in a second position.

13. Device according to claim 11, wherein the filling tray has means for connecting the filling tray to a conduit for supplying liquid, wherein furthermore means are provided which are suitable to allow the connection to be open in a first position, and to close the connection in a second position, and wherein a float mechanism is provided in the filling tray to operate the latter means depending on a liquid level in the filling tray.

14. Device according to claim 11, further comprising at least two supply systems, wherein each supply system has a reservoir for containing a quantity of disinfecting agent, a conduit for supplying disinfecting agent to the treatment tray, and a pump for displacing disinfecting agent from the reservoir to the treatment tray, through the conduit.

15. Device according to claim 11, further comprising means for controlling various components of the device according to predetermined routines, wherein means for detecting relevant parameters are also provided and coupled to the controlling means.

16. Device for performing a cleaning and/or disinfecting treatment on body parts of animals comprising:
   a treatment zone for receiving animals to be treated;
   a guide to guide the animals through the treatment zone in a defined walking direction;
   a treatment tray containing a quantity of cleaning and/or disinfecting liquid, the treatment tray located at ground level in the treatment zone, and in a horizontal operational position, such that the treatment tray is trod upon by the animals; and
   a tilting mechanism for tilting the treatment tray and thereby allowing at least a portion of the cleaning and/or disinfecting liquid to drain off from the treatment tray to an area that is located outside of areas located in front and behind the device as seen in the walking direction.

17. Device according to claim 16, wherein the tilting mechanism comprises at least one retractable and extendable bar connected to a frame and the treatment tray.

18. Device according to claim 16 further comprising at least two supply systems, wherein each supply system comprises:
   a reservoir for containing the cleaning and/or disinfecting liquid;
   a conduit for supplying at least a portion of the cleaning and/or disinfecting liquid to the treatment tray; and,
   a pump for displacing at least a portion of the cleaning and/or disinfecting liquid from the reservoir to the treatment tray through the conduit.

19. Device according to claim 16 further comprising a filling tray and a conduit, the filling tray arranged at a higher level in the device than the treatment tray, the filling tray containing a quantity of the cleaning and/or disinfecting liquid, wherein the conduit provides for transportation of at least a portion of the cleaning and/or disinfecting liquid from the filling tray to the treatment tray.

20. Device according to claim 16 further comprising controls automating the various components of the device according to predetermined routines.

* * * * *